United States Patent Office 3,350,417
Patented Oct. 31, 1967

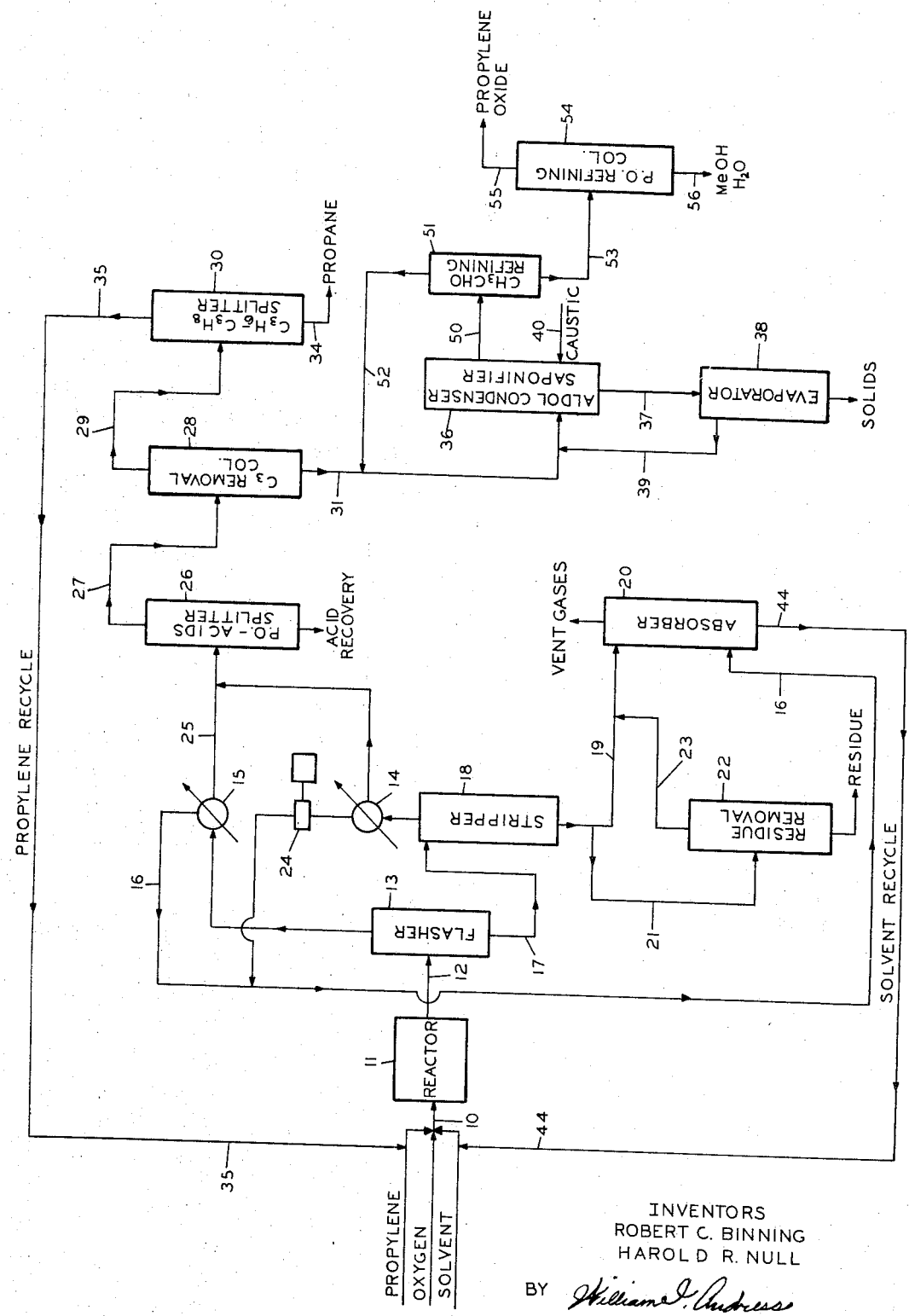

3,350,417
PRODUCTION AND RECOVERY OF PROPYLENE OXIDE BY PLURAL STAGE DISTILLATION AND CAUSTIC ADDITION
Robert C. Binning, St. Louis, and Harold R. Null, Florissant, Mo., assignors to Monsanto Company, a corporation of Delaware
Filed Feb. 12, 1964, Ser. No. 344,390
14 Claims. (Cl. 260—348.5)

ABSTRACT OF THE DISCLOSURE

This invention relates to the production and recovery of propylene oxide, involving the direct oxidation of propylene feedstocks with molecular oxygen in a liquid reaction medium comprising fully esterified polyacyl esters of polyhydroxyalkanes, polyhydroxycycloalkanes, polyglycols and mixtures thereof, and recovering propylene oxide by means of parallel and serial plural stage distillation zones and a caustic treatment to simultaneously aldolize acetaldehyde and saponify methyl formate in a mixture of these components together with propylene oxide and further refining the propylene oxide in a distillation zone.

---

The present invention relates to the production and recovery of commercially valuable chemicals. More particularly, the present invention relates to the production and recovery of propylene oxide. Still more particularly, the present invention relates to the non-catalytic direct oxidation of propylene, with molecular oxygen in the liquid phase to produce propylene oxide, as the primary product species, and to means for separating this commercially valuable compound from the many other less-valuable oxygenated products of the reaction.

Among prior art processes for the production of propylene oxide are the well-known chlorohydrin process, numerous vapor phase catalytic olefin oxidation processes and various liquid phase processes. However, prior art methods for producing propylene oxide suffer one or more disadvantages which make them commercially unattractive. For example, the older chlorohydrin process, which is used commercially, is essentially a two-step process involving, first, chlorohydrinating propylene with hypochlorous acid to form propylene chlorohydrin and, then, hydrolysis of this intermediate with calcium hydroxide to form the desired propylene oxide. This procedure is disadvantageous because it is not a direct route to the preparation of the epoxide and, also, gives rise to chlorinated by-products which are undesirable. Moreover, this process to be operated efficiently must utilize purified ethylene or propylene substrates.

Vapor phase processes involving, e.g., the catalytic oxidation of propylene to the corresponding oxide, are disadvantageous for several reasons. For example, these processes require large volume equipment and the handling of tremendous quantities of potentially explosive mixtures of propylene and oxygen. In addition, the epoxide yields obtained according to these processes are generally lower than those obtained in liquid phase processes.

Direct routes for the production and recovery of olefin oxides have been described in the prior art. For example, one method involves the oxidation of olefins with peracetic acid to the corresponding epoxide. Disadvantages of this process are that rates of reaction of the peracid with unsubstituted substrates, such as ethylene and propylene, are very slow due to the ionic nature of the reaction. Moreover, this process is potentially hazardous if relatively large quantities of peracid are to be used.

There are scattered references to still another method of preparing olefin oxides, namely the liquid phase oxidation of olefins with molecular oxygen. Most of these, as in peracetic acid oxidation processes, are restrictive in the sense that specific limitations are incorporated in each method. For example, catalysts or other additives or secondary treatment of the oxidation mixtures with basic materials are essential features of these methods.

Since the present invention is concerned with a novel liquid phase olefin epoxidation and product recovery system, the discussion below will be directed to typical existing prior art schemes for liquid phase olefin oxidation systems. These prior art processes describe a variety of approaches to a proper balancing of a series of reaction variables in order to obtain the desired olefin oxide. For example, various specific oxidation catalysts, catalyst-solvent, or catalyst-promoter-solvent systems have been described (U.S. Patents 2,741,623, 2,837,424, 2,974,161, 2,985,668 and 3,071,601); another approach is the incorporation of oxidation anti-catalysts which retard certain undesirable side reactions (U.S. Patent 2,279,470); still another approach emphasizes the use of water-immiscible hydrocarbon solvents alone, or in the presence of oxidation catalysts and/or polymerization inhibitors such as nitrobenzene (U.S. Patent 2,780,635); or in the presence of saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

While the addition of various additives in some prior art processes may accomplish the purpose for which they were used, e.g., neutralization of acid by addition of alkaline substances, the additives themselves introduce other problems and disadvantages into a process. For example, in the liquid phase oxidation of olefins with molecular oxygen acids, such as acetic and formic acids, are formed. The latter acid, in substantial quantities, is recognized as being deleterious in the reaction. Hence, prior art efforts have been directed to selectively removing the deleterious formic acid from the relatively innocuous acetic (or other organic acids) or to the removal of all acidic components from the reaction mixture. Commonly, these acids are neutralized by the addition of alkaline materials to the main oxidation reactor and/or to auxiliary acid extraction vessels. Typical alkaline materials added include alkali metal hydroxides and carbonates, alkaline earth oxides, hydroxides and carbonates, mildly basic heavy metal hydroxides, ammonium hydrates and metal hydrates, salts of weak acids, e.g., acetic acid and other carboxylates such as metal salts of tartaric, stearic, oleic and palmitic acids. However, the use of these basic materials presents additional process problems. For example, many alkaline materials form insoluble salts with the organic acids and as these salts continue to accumulate, control of the main oxidation reaction is rendered more difficult. Consequently, salt removal systems, e.g., filters, evaporators, crystallizers, solvent extractors and the like, must be incorporated into the process apparatus. On the other hand, use of soluble alkaline substances leads to the formation of colored or resinous materials which cause gumming of apparatus components.

It is, therefore, an object of the present invention to provide a process for the production and recovery of propylene oxide which is free of numerous limitations recited in prior art processes.

An object of this invention is to provide a liquid phase non-catalytic direct oxidation of olefins with molecular oxygen to produce and recover propylene oxide and other valuable oxygenated products.

A further object of the present invention is the elimination of numerous apparatus components heretofore required in separation and refining trains for the recovery of propylene oxide and other oxygenated products produced in the direct oxidation of olefins.

A further object of this invention is to provide a liquid phase process for the production of propylene oxide which is not dependent upon the presence or absence of any catalyst; nor is it dependent upon the presence of water-immiscible solvents or upon solvents containing added buffers or acid neutralizers or other additives or secondary treatments with alkaline materials to remove acidic components; nor is it dependent upon the presence of saturated compounds, initiators, promoters or anticatalyists; further, it is not dependent upon critical pH levels of the reaction mixture or geometries.

These and other objects will become apparent as the description of the invention proceeds.

The invention will be more fully understood by reference to the accompanying drawing which constitutes a part of the present invention.

In the figure is shown a diagrammatic flow sheet illustrating a preferred embodiment of the invention.

The present invention comprises the production of propylene oxide and other valuable oxygenated products by the direct oxidation of propylene with molecular oxygen in the liquid phase, and to a novel means of separating and recovering the formed propylene oxide.

The liquid phase in which the oxidation occurs comprises solvents which are essentially chemically indifferent, high-boiling with respect to volatile oxidation products and are oxidatively and thermally stable under the condition of the reaction described. Further, the solvents employed in the present invention are highly resistant to attack by free radicals which are generated in the oxidation process. Moreover, the solvents employed in the instant invention are effective in assuaging the deleterious effects of acidic components, especially formic acid and to a lesser degree acetic acid, which are formed in the oxidation of olefins. This assuaging effect is achieved, in part, by a proton solvation of the acidic components by the solvent which results in an "acid-leveling" which, in turn, permits substantially complete retention of the propylene oxide formed in the oxidation.

Solvents primarily and preferably contemplated herein comprise fully esterified polyacyl esters of polyhydroxyalkanes, polyhydroxycycloalkanes, polyglycols and mixtures thereof. Polyacyl esters comtemplated herein contain, generally, from 1 to 18 carbon atoms in each acyl moiety and from 2 to 18 carbon atoms in each alkylene or cycloalkylene moiety. However, best results obtain when the acyl moiety contains from 1 to 6 carbon atoms and the alkylene and cycloalkylene moiety each contains from 2 to 6 carbon atoms. These esters may be readily prepared by methods known to the art. For example, in U.S. Patent 1,534,752 is described a method whereby glycols are reacted wth carboxylic acids to produce the corresponding glycol ester. Acid anhydrides may be used in place of the acids.

Representative glycols include straight chain glycols, such as ethylene glycol, propylene glycol, butylene glycol, pentylene glycol, hexylene glycol, heptylene glycol, octylene glycol, nonylene glycol, decylene glycol, dodecylene glycol, pentadecylene glycol and octadecylene glycol. Branched-chained glycols such as the iso-, primary, secondary and tertiary isomers of the above straight chain glycols are likewise suitable, e.g., isobutylene glycol, primary, secondary, and tertiary amylene glycols, 2-methyl-2,4 pentanediol, 2-ethyl-1,3-hexanediol, 2,3-dimethyl-2,3-butanediol, 2-methyl-2,3-butanediol and 2,3-dimethyl-2,3-dodecanediol. Polyalkylene glycols (polyols) include diethylene glycol, dipropylene glycol, tripropylene glycol, tetrapropylene glycol and dihexylene glycol.

In addition to straight and branched-chain glycols, alicyclic glycols such as 1,2-cyclopentanediol, 1,2-cyclohexanediol, 1-methyl-1,2-cyclohexanediol and the like may be used.

Other suitable hydroxy compounds include polyhydroxy alkanes, such as glycerol, erythritol and pentaerythritol and the like.

Representative carboxylic acids include fatty acids such as formic acid, acetic acid, propionic acid, butyric acid, valeric acid, caproic acid, caprylic acid, lauric acid, palmitic acid, stearic acid, naphthenic acids, such as cyclopentane carboxylic acid, cyclohexane carboxylic acid, and aromatic acids such as benzoic acid and the like.

Representative polyacyl esters include polyacyl esters of polyhydroxy alkanes, such as triacyl esters of glycerol, e.g., glycerol triacetate; tetraacyl esters of erythritol and pentaerythritol, e.g., erythritol tetraacetate and pentaerythritol tetraacetate and the like, and polyacyl esters of polyalkylene glycols (polyglycols), such as diethylene glycol diacetate, dipropylene glycol diacetate, tetraethylene glycol diacetate and the like. These polyacyl ester solvents may be used individually or as mixtures, being compatible with each other. For example, a mixture of varying proportions of a diacyl ester of a hydroxyalkane, such as propylene glycol diacetate, and a polyacyl ester of a polyglycol, such as dipropylene glycol diacetate, may be used. Or, a mixture of a polyacyl ester of a polyglycol, such as dibutylene glycol dibutyrate, and a polyacyl ester of a polyhydroxy alkane, such as glycerol trivalerate, or pentaerythritol tetrapropionate may be used as the solvent in the instant process illustrated in the example below.

Of particular interest in the present process are the vicinal diacyl esters of alkylene glycols, such as the diformates, diacetates, dipropionates, dibutyrates, divalerates, dicaproates, dicaprylates, dilaurates, dipalmitates and distearates, and mixtures thereof, of the alkylene and polyalkylene glycols recited above. Still more particularly, of greater interest are the diacetates of ethylene and propylene glycols used individually or in admixtures of any proportion.

Polyacyl esters having mixed acyl groups are likewise suitable, e.g., ethylene glycol formate butyrate, propylene glycol acetate propionate, propylene glycol butyrate propionate, butylene glycol acetate caporate, diethylene glycol acetate butyrate, dipropylene glycol propionate caproate, tetraethylene glycol butyrate caprylate, erythritol diacetate dipropionate, pentaerythritol dibutyrate divalerate, glycerol dipropinoate butyrate and cyclohexanediol acetate valerate.

The above-recited polyacyl esters are more fully described and claimed as solvents in the direct oxidation of olefins with molecular oxygen in copending U.S. application Ser. No. 259,388 filed Feb. 18, 1963, now U.S. Patent No. 3,153,058 which is a continuation-in-part of U.S. application Ser. No. 175,315 filed Feb. 23, 1962 and now abandoned.

Monoacyl esters of polyhydroxyalkanes and polyglycols are unsuitable for use as a reaction medium according to the present process. The same is true of other hydroxy or hydroxylated compounds such as glycerin, glycols, polyglycols and hydroxy carboxylic acids. This is due to the presence of an abundance of reactive hydroxyl groups which are susceptible to autooxidative attack, hence, introduce a concomitant oxidation side reaction which competes with the desired direct epoxidation of the olefin, and too, these hydroxyl groups when esterified with organic acids present, produce water which together with water normally formed in the reaction provide quantities sufficient to inhibit the oxidation of the olefin to the olefin oxide and/or to hydrolyze the olefin oxide present.

In the preferred mode of operation the polyacyl esters used herein constitute the major proportion of the liquid reaction medium with respect to all other constituents including reactants, oxidation products and co-products dissolved therein. By major is meant that enough solvent is always present to exceed the combined weight of all other constituents. However, it is within the purview of this invention, although a less preferred embodiment, to operate in such manner that the combined weight of all components in the liquid phase other than polyacyl esters exceeds that of the polyacyl ester solvent. For example, a refinery grade hydrocarbon feedstack or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including the olefin oxide, intermediates such as acetone and methyl acetate, and high boilers (components having boiling points higher than that of the polyacyl ester solvent) formed in the reaction and/or recycled to the reactor may constitute as much as 75% by weight of the liquid reaction medium, according to reaction conditions or recycle conditions.

When carrying out the invention according to the less preferred mode of operation, the quantity of polyacyl ester solvent present in the liquid reaction medium should be not less than 25% by weight of said medium in order to advantageously utilize the aforementioned benefits characteritsic to these unique olefin oxidation solvents.

In further embodiments of the present invention for oxidizing olefins with molecular oxygen in the liquid phase, the polyacyl ester solvents are suitably used in combination with diluents or auxiliary solvents which are high boiling with respect to volatile oxidation products, are relatively chemically and indifferent and oxidatively and thermally stable under reaction conditions. Here, too, the polyacyl ester solvents should be utilized in quantities not less than 25% by weight of the liquid reaction medium in order to retain the superior benefits of these polyacyl ester solvents in liquid phase olefin oxidations.

Suitable diluents which may be utilized with the polyacyl ester solvents of this invention include, e.g., hydrocarbon solvents such as xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; diaryl sulfoxides, e.g., diphenyl sulfoxide; dialkyl and diaryl sulfones, e.g., dimethyl sulfone and dixylyl sulfone and nitroalkanes, e.g., nitrohexane. While the foregoing have been cited as typical diluents which may be used in combination with the polyacyl ester solvents in this invention, it is to be understood that these are not the only diluents which can be used. In fact, the benefits accruing from the use of these polyacyl esters can be utilized advantageously when substantially any relatively chemically indifferent diluent is combined therewith.

Therefore, the present invention in its broadest use comprehends the oxidation of olefin-containing feedstocks in a liquid reaction medium consisting essentially of at least 25% by weight based on said medium of at least one fully esterified polyacyl ester described above.

In any case, the liquid reaction medium referred to herein is defined as that portion of the total reactor content which is in the liquid phase.

It is therefore apparent that the liquid reaction media contemplated herein possess not only those characteristics described in prior art solvents, viz., they are high boiling with respect to volatile oxidation products under the conditions of reaction, essentially chemically indifferent and oxidatively and thermally stable, but in addition, possess characteristics not described in prior art oxidations, viz., resistance to free radical attack, the ability to reduce and/or eliminate the deleterious effects of acidic components by proton solvation and/or ester interchange. In addition, due to the facile manner in which the present oxidation proceeds in the described solvents, no oxidation catalysts, promoters, initiators, buffers, neutralizers, polymerization inhibitors, etc. are required as in many prior art processes.

As noted above, no added catalysts are required in the present oxidation process. However, due to the versatality of the above-described solvents in olefin oxidations, the usual oxidation catalysts can be tolerated although usually no significant benefit accrues from their use. For example, metalliferous catalysts such as platinum, selenium, vanadium, iron, nickel, cobalt, cerium, chromium, manganese, silver, cadmium, mercury and their compounds, preferably in the oxide form, etc., may be present in gross form, supported or unsupported, or as finely divided suspensions.

In like manner, since the olefin oxidations according to this invention proceed at a rapid rate after a brief induction period, no initiators or promoters are required, but may be used to shorten or eliminate the brief induction period, after which no additional initator or promoter need be added.

Suitable initiators include organic peroxides, such as benzoyl peroxide; inorganic peroxides, such as hydrogen and sodium peroxides; peracids, such as peracetic and perbenzoic acids; ketones, such as acetone; ethers, such as diethyl ether; and aldehydes, such as acetaldehyde, propionaldehyde and isobutyraldehyde.

Use of the solvents described herein being free of the necessity to use various additives described in prior art processes, enhances the separation and recovery of propylene oxides by the sequence of steps described in detail below.

In carrying out the process of the instant invention, the reaction mixture may be made up in a variety of ways. For example, the olefin and oxygen may be pre-mixed with the solvent and introduced into the reactor, or the olefin may be premixed with the solvent (suitably, up to 50% by weight based on the solvent and, preferably, from 5 to 30% by weight based on the solvent). Preferably, the olefin is pre-mixed with the solvent and the oxygen-containing gas introduced into the olefin-solvent mixture incrementally, or continuously, or the olefin and oxygen-containing gas may be introduced simultaneously through separate or common feedlines into a body of the solvent in a suitable reaction vessel (described below). In one embodiment an olefin and oxygen-containing gas mixture is introduced into the solvent in a continuously stirred tank reactor, under the conditions of temperature and pressure described below. Suitable olefin: oxygen volumetric ratios are within the range of 1:5 to 15:1. Feed rates, generally, may vary from 0.5 to 1500 ft.³/hr., or higher, and will largely depend upon reactor size. The oxygen input is adjusted in such manner as to prevent an excess of oxygen (>1%) in the off-gas or above the reaction mixture. Otherwise, a hazardous concentration of explosive gases is present. Also, if the oxygen (or air) feed rate is too high the olefin will be stripped from the mixture, thus reducing the concentration of olefin in the liquid phase and reducing the rate of oxidation of the olefin, hence giving lower conversions per unit time.

Intimate contact of the reactions, olefin and molecular oxygen in the solvent is obtained by various means known to the art, e.g., by stirring, shaking, vibration, spraying, sparging or other vigorous agitation of the reaction mixture.

The olefin feed stocks contemplated herein include pure propylene, mixtures of propylene with other olefins, e.g., ethylene, or olefin stocks containing as much as 50% or more of saturated compounds, e.g., propane. Olefinic feed materials include those formed by cracking hydrocarbon oils, paraffin wax or other petroleum fractions such as lubricating oil stocks, gas oils, kerosenes, naphthas and the like.

The reaction temperatures and pressures are subject only to those limits outside which substantial decomposition, polymerization and excessive side reactions occur in liquid phase oxidations of propylene with molecular oxygen. Generally, temperatures of the order of 50° C. to 400° C. are contemplated. Temperature levels sufficiently high to prevent substantial build-up of any hazardous peroxides which form are important from considerations of safe operation. Preferred temperatures are within the range of from 140° C. to 250° C. Still more preferred temperatures are within the range of from 160° C. to 210° C. Suitable pressures herein are within the range of from 0.5 to 350 atmospheres, i.e., subatmospheric, atmospheric or superatmospheric pressures. However, the oxidation reaction is facilitated by use of higher temperatures and pressures, hence, the preferred pressure range is from 5 to 200 atmospheres. Still more preferred pressures are within the range of from 25 to 75 atmospheres. Pressures and temperatures selected will, of course, be such as to maintain a liquid phase.

The oxidation of olefins, e.g., propylene, in the present process is auto-catalytic, proceeding very rapidly after a brief induction period. A typical oxidation of propylene in a batch run requires from about 1 to 20 minutes. Similar, or faster, reaction rates obtain in continuous operation, e.g., as low as 0.1 min. reactor residence time.

The reaction vessel may consist of a wide variety of materials. For example, aluminum, silver, nickel, almost any kind of ceramic material, porcelain, glass, silica and various stainless steels, e.g. Hastelloy C, are suitable. It should be noted that in the instant process where no added catalysts are necessary, no reliance is made upon the walls of the reactor to furnish catalytic activity. Hence, no regard is given to reactor geometry to furnish large-surface catalytic activity.

The oxidation products are removed from the reactor, preferably, as a combined liquid and gaseous mixture, or the liquid reaction mixture containing the oxidation products is removed to a products separation system, a feature of which comprises in combination a flasher-stripper let-down arrangement. This arrangement in combination with the preceding propylene oxidation reaction and with succeeding product-separation steps constitutes a unique, safe, simple, economic and practical process for the commercial production and recovery of olefin oxides.

In regard to the flasher-stripper let-down system, principal advantages accruing from its use are that the system simultaneously (1) utilizes the heat of the oxidation reaction in the initial separation of gaseous and liquid products; this eliminates the need of cooling the reactor effluent, (2) minimizes the amount of overhead solvent consistent with the maximum amount of olefin oxide, e.g., propylene oxide (P.O.) all of which goes overhead; (3) minimizes the amount of total overhead solvent, resulting in a reduced solvent load on subsequent distillation columns. The advantages of this reduced solvent load are that smaller columns are required for the requisite products separations; (4) reduces to trace amounts the quantity of acidic components (most importantly, formic acid) in solvent recycle streams, and (5) removes the bulk of the fixed gases and very volatile components, thus reducing the pressure requirements to prevent excessive loss of product in subsequent processing steps.

A particular feature of the flasher-stripper let-down combination is that in the flasher an initial separation of about one-third of the acids formed in the reaction is accomplished and these are taken overhead; and by use of a stripping column for treatment of the flasher bottoms, substantially all of the remaining acids, i.e., all but about 0.05 to 0.2 wt. percent based on the recycle stream are removed from the recycle solvent. Advantages afforded by such clean separation of acid values, particularly highly corrosive formic acid, from the recycle solvent are that all equipment for processing the stripper bottoms can now be made of plain inexpensive carbon steel, replacing very expensive corrosion resistant stainless steels such as Hastelloy C, and the like, hitherto required. The economic advantages are manifest. Additionally, acids such as formic acid which are known to have an adverse effect upon the yield of olefin oxides in the primary oxidation reaction, as discussed above, are no longer made available, by means of recycle solvent in quantities sufficient to exert a deleterious effect on olefin oxide yield.

The total effect of the foregoing advantages is to provide an efficient, rapid economical method for stabilizing the propylene oxide reaction mixtures while unloading solvent from the oxidation products and recycling solvent to the reactor.

In contrast to the flasher-stripper combination used herein the use of individual flashers or distillation columns in the initial separation of the products from the reactor effluent is inadequate for various reasons. For example, a single flasher cannot simultaneously minimize the quantity of overhead solvent, hence reducing the liquid load in the distillation columns in the separation train, while minimizing the amount of propylene oxide in the bottoms stream recycled to the main reactor. If conditions of temperature and pressure in a single flasher are so adjusted as to permit the desired amount of solvent to go overhead, a large amount of acids (15 wt. percent or more) appear in the bottoms stream and are recycled to the reactor. Moreover, in using a single flasher substantial quantities of propylene oxide (on the order of 30–40% of that produced) are taken as bottoms and recycled to the reactor thus reducing total yield; whereas in the present flasher-stripper combination virtually all of the formed propylene oxide is removed from the recycle stream.

Further, when a single distillation column is used in the initial gas-liquid separation of reactor effluent this column must be approximately five times as large in cross sectional area as that column used herein into which the combined overhead streams of the flasher and stripper are fed. In feeding the gas-liquid effluent directly into a distillation column a large amount of fixed gases are present, thus reducing plate efficiency and requiring additional plates which materially adds to the cost of operation. A further disadvantage of having large quantities of fixed gases in a distillation column adjacent to the reactor is that much higher pressures and refrigerants (as opposed to cooling water) are required to condense overhead gases.

On the other hand, use of a plurality of distillation or stripping columns to effect an initial gas-liquid separation of the reactor effluent is disadvantageous primarily because of the required increase in product hold-time in these columns. This increased hold-time necessitates longer exposure of the desired propylene oxide to the deleterious action of formic acid and/or undesired secondary reactions with co-products as by hydrolysis, esterification, polymerization or decomposition. In addition, when no flashers are used the total reactor effluent is loaded into these distillation columns thus requiring equipment of increased capacity and separation efficiency. Elimination of a flasher, moreover, increases capital outlay since distillation columns are much more expensive than flashers.

The flasher-stripper let-down combination used herein is in like manner superior to let-down arrangements comprising a plurality of flashers for a number of reasons. Primarily, by use of a flasher-stripper combination greater control and flexibility of process operation is assured, it being much easier to change product separation specifications and operations in a stripper than in a flasher. This is accomplished principally by controlling the heat input to the stripper from a reboiler. Since a flasher has only one equilibrium stage, a stripper magnifies by several stages, depending upon the number and efficiency of plates therein, the degree of separation of products achieved by flashers: Another advantage of the flasher-stripper arrangement herein over the use of plural flashers is that using e.g., a two-flasher let-down arrangement an undesirable amount of propylene oxide (on the order of 7–8% of that produced) is recycled to the main oxidation reactor, thus reducing total yield. On the other hand, using the flasher-stripper combination described herein virtually all of the propylene oxide is separated from recycle solvent. A further advantage of using a stripper in place of a second flasher is that the former removes all but a small amount, i.e., approximately 0.05 to 0.2 wt. percent, based on total recycle stream, of formed acids from the recycle solvent, whereas by use of flashers about 1–2 wt. percent of acids remain in the recycle solvent.

The overhead from the flasher and stripper is passed to condensers from which a stream of condensables is passed to a splitter from which acids, water, intermediate boilers and residual solvent are removed as bottoms and an overhead stream containing propylene oxide and lower boiling components is removed overhead and passed to a $C_3$ removal zone. The $C_3$ removal zone serves to separate propylene and propane overhead from propylene oxide, methyl formate and acetaldehyde which are removed as bottoms. The propylene may be separated from the propane and the former recycled to the reactor or, alternatively, the entire overhead from the $C_3$ removal column processed as described below.

A further feature of the present process is the simultaneous removal of methyl formate and acetaldehyde from propylene oxide in the bottoms from $C_3$ removal zone. Propylene oxide mixtures containing various impurities are usually subjected to various distillation procedures to purify the propylene oxide. However, straight distillation is impractical because of certain impurities having boiling points close to that of the propylene oxide.

In the present process the propylene oxide stream from the $C_3$ removal zone containing methyl formate and acetaldehyde as impurities is passed to a reactor wherein methyl formate is saponified and acetaldehyde is aldolized, simultaneously, with caustic materials. Overhead from the aldol condenser-saponifier reactor is passed to a small refining column to remove any acetaldehyde not completely aldolized in the reactor. Overhead from this refining column is recycled to the aldol condenser-saponifier and bottoms from the refining column are sent to a propylene oxide refining column. The small refining column can be omitted when operating the aldol condenser-saponifier under conditions assuring complete aldolization of the acetaldehyde and the overhead from the reactor then passed directly to a propylene oxide refining column. Bottoms from this reactor go to an evaporator from which solids are removed as bottoms and discarded, while the overhead from the evaporator containing a small amount of propylene oxide is recycled to the aldol condenser-saponifier.

Caustic materials which are suitably used in the aldol condenser-saponifier reactor include, preferably, dilute alkali metal hydroxides and carbonates such as sodium, lithium and potassium hyroxides and carbonates; alkaline earth hydroxides and carbonates such as calcium, strontium and barium hydroxides and carbonates; basic heavy metal hydroxides, e.g., aluminum, zinc, manganese, iron, cobalt and nickel hydroxides; salts of weak acids, e.g., acetic acid and other carboxylates such as metal salts of tartaric, stearic, oleic and palmitic acids, and the like. These caustic materials are used in aqueous solutions of from 1 to 10 N and, preferably, from 2 to 5 N concentration.

A preferred specific embodiment of the present invention will be described with reference to the accompanying drawing in connection with the direct oxidation of propylene to propylene oxide in a continuous operation, and a specific novel method of separating and refining this valuable product from other oxygenated products formed in the reaction. Suitable variations in the propylene oxide separation train are also disclosed. Such conventional equipment as motors, pumps, valves, gauges, reflux condensers, reboilers, safety heads and the like are not shown in the drawing, but their inclusion is a variation readily apparent to those skilled in the art.

EXAMPLE

In this process a one-liter Magnedrive autoclave serves as the reactor portion of a continuous system. Solvent, propylene and oxygen are introduced through a bottom port directly below a Dispersimax turbine agitator operating at 1500 r.p.m. to obtain efficient mixing and internal gas recycle. The reactor is heated electrically and temperature control is maintained by modulating water flow through internal cooling coils. Reaction temperatures are continuously recorded on a strip-chart.

In operation the reactants, 92% propylene and 95% oxygen, together with propylene glycol diacetate, a preferred solvent, are pre-mixed and fed through line 10 to the base of reactor 11, operating at 750 p.s.i.g. and 200° C. The molar feed ratio of $C_3H_6/O_2$ is 1.5. Total hold time is about 4 minutes. A variation is to provide two or more reactors in parallel operating under identical conditions and feeding the effluent from these reactors into the flasher-stripper letdown system described below.

The reaction product, a combined gas-liquid effluent, is fed continuously to flasher 13. Flasher 13 operates at 150 p.s.i.a. pressure and 200° C. From this flasher most of the low and intermediate boiling components including all unreacted propylene, $CO_2$ and at least one-half, and in this example approximately 65%, of the propylene oxide goes overhead along with about one-third of the acids, e.g., formic and acetic acids, all dissolved gases and about 6–8% of solvent. Bottoms from flasher 13 are fed to stripping column 18 operating at about 24.7 p.s.i.a. and 210° C. at the bottom and using 8 distillation plates. The residual propylene oxide, i.e., generally between 30% and 50% of that formed, and about 35% in this example, substantially all of the remaining acids, lighter components and 10–15% of the solvent are vaporized and taken overhead. Bottoms from stripper 18 containing the bulk of the solvent are fed through line 19 to absorber 20. A side stream 21 of the solvent effluent from stripper 18 is fed to residue removal stripper column 22 where residue, i.e., reaction products having boiling points above that of the solvent, is removed as bottoms and the solvent is removed overhead through line 23 and fed to the absorber via stripper bottoms stream 19, thus increasing the absorbing capacity of absorber 20. Column 22 is heated to about 153° C. at the top and 210° C. at the bottom at a pressure of 250 mm. Hg absolute. Seven distillation plates are used in the residual removal column.

Overhead from flasher 13 and stripper 18 are directed to partial condensers 15 and 14, respectively, operating with cooling water. In condenser 15 uncondensables, including fixed gases, most of the $CO_2$, about 6% of the total propylene oxide and small amounts of propylene, i.e., about one-half of the unreacted propylene, and propane are separated from the condensables and fed through line 16 countercurrently to the solvent bottoms from stripper 18 to absorber 20. The uncondensables from condenser 14 containing $CO_2$, propane and propylene are either discarded if desired or, optionally, compressed in compressor 24 and fed to the absorber via line 16 to recover the propylene. Absorber 20 operates at 120 p.s.i.a. and at temperatures of about 70° C. at the top and 100° C. at the bottom and has twenty plates. Fixed gases, $O_2$, $H_2$, $N_2$, $CH_4$, CO and $CO_2$ are vented from the top of the absorber. Propane, propylene, propylene oxide and other soluble components are absorbed in the solvent which is recycled to the reactor through line 44 or, alternatively, further processed for propylene purification, as will be discussed below.

The condensed liquids from condenser 14 are combined with those from condenser 15 and this combined stream containing 99+% of the propylene oxide, most of the acids and from 15–20% of the solvent is fed through line 25 to distillation column 26. In this column propylene oxide and lower boiling components such as propylene, propane, acetaldehyde, methyl formate, and a small amount of residual $CO_2$ are removed overhead, and water, acids, methanol, acetone, methyl acetate and residual solvent are removed as bottoms. The bottoms stream may then be processed further to recover the solvent and such commercially valuable by-produces as acetic acid or other values. Column 26 is heated to about 40° C. at the top and 210° C. at the bottom and operates at 150 p.s.i.a. Forty plates are used with a reflux ratio of 0.16.

The overhead stream from column 26 is fed through line 27 to a $C_3$ removal column 28. This column is heated to about 50° C. at the top and 160° C. at the bottom and 300 p.s.i.a., and propylene, propane and any residual $CO_2$ are removed overhead; propylene oxide, acetaldehyde and methyl formate are removed as bottoms. Thirty-four plates and a reflux ratio of 0.31 are used. The overhead from this column is fed through line 29 to a propane-propylene splitter column 30. This column is heated to about 50° C. at the top and 55° C. under 300 p.s.i.a. Ninety-four plates and a reflux ratio of 11.7 are utilized. Propane is removed from the bottom through line 34 and propylene is taken overhead through line 35 and recycled to the reactor. Some propane may be driven overhead, if desired, for recycle by increasing the temperature at the bottom of this column.

An alternative procedure for removing propane from recycle propylene is to combine the overhead from column 28 with the overhead stream in line 16 from condenser 15 leading to absorber 20. As mentioned previously, the liquid bottoms from the absorber containing solvent, propylene and propane may be recycled directly to the reactor or further processed for propylene purification, i.e., propane removal. When the concentration of propane in the reactor tends to build up to a level which interferes with the propylene oxidation, additional, or excess, propane is prevented from being recycled to the reactor by directing the effluent from absorber 20, wholly or partially, through a side-stream taken from line 44, e.g., by means of a distributing valve into a desorber operated at about 50° C. at the top and 100° C. at the bottom and 300 p.s.i.a. pressure. Here, solvent is removed as bottoms and recycled to the reactor through line 44, and propane and propylene are removed overhead to a $C_3H_6$–$C_3H_8$ splitter operating at 300 p.s.i.a. and heated to about 50° C. at the top and 55° C. at the bottom. Propane is removed as bottoms and propylene of essentially the same composition as the initial feed material is recycled to the reactor propylene feed stream.

The bottoms from column 28 containing propylene oxide, acetaldehyde and methyl formate is fed through line 31 to aldol condenser-saponifier 36, a 500 ml. stirred reactor containing a 3 N aqueous solution of sodium hydroxide, wherein acetaldehyde is aldolized and methyl formate saponified simultaneously. This reactor is operated at about 50° C. and 5 atmospheres pressure, reactor residence time, about 25 minutes. In general, reactor 36 is operable at temperatures within the range of 0° C. to 200° C., preferably from 25° C. to 75° C., and pressures sufficient to maintain a liquid phase, preferably, from 1 to 10 atmospheres. A variant embodiment of this phase of the process is the utilization of two or more aldol condenser-saponifiers to perform the simultaneous aldolization of acetaldehyde and saponification of methyl formate.

In reactor 36 the reaction mixture separates into an upper organic phase containing over 99% of the propylene oxide, methanol, and any unreacted acetaldehyde, and a lower aqueous phase containing a small amount of propylene oxide, i.e., less than 1%, aldol, crotonaldehyde, water, methanol, sodium acetate and sodium formate. Effluent bottoms from reactor 36 is removed through line 37 to evaporator 38 operating at about 100° C. and 15 p.s.i. pressure. Solids, including aldol polymers, sodium acetate and sodium formate are removed as bottoms, while an overhead stream containing moved as bottoms, while an overhead stream containing propylene oxide (about 1%), crotonaldehyde, methanol and water is recycled through line 39 to reactor 36. Make-up caustic is supplied through line 40.

Overhead from reactor 36 containing predominantly propylene oxide and a small amount of methanol, water and traces of acetaldehyde not completely adolized is directed through line 50 to a small refining column 51 where a final separation of any acetaldehyde from propylene oxide is accomplished. This small refining column has 35 plates and operates at a reflux ratio of about 15.0 under pressure of 33 p.s.i.a. and temperatures of about 50° C. at the top and 60° C. at the bottom. The overhead from column 51 containing a small amount of propylene oxide and traces of acetaldehyde is recycled to aldol condenser-saponifier 36 through lines 52 and 31. Bottoms from column 51 containing mostly propylene oxide, together with small amounts of methanol and water, are removed through line 53 to a final propylene oxide refining column 54. Twenty-one plates and a reflux ratio of 1.0 are used in this column operating at a pressure of 30 p.s.i.a. and temperatures of 50° C. at the top and 125° C. at the bottom. Water and methanol are withdrawn from the bottom and propylene oxide of 99+% purity is withdrawn through line 44 as product from the top.

In a typical run according to the present embodiment feed materials are added at approximately the following hourly rates: propylene, 530 g., oxygen, 270 g. and solvent (propylene glycol diacetate), 4600 g. At steady state (reactor residence time about 4.0 minutes) propylene conversion is 54%, oxygen conversion is 99.9% and propylene oxide yield is about 46%.

While the invention has been specifically described with reference to the production and recovery of propylene oxide, it is within the purvey of the invention to utilize the above-described and illustrated system for the oxidation of other olefinic compounds to the corresponding olefin oxide and recovery thereof. It being understood that process conditions, e.g., temperatures and pressures in the reactor, flasher, stripper and columns will be modified accordingly to make the necessary separations.

Other olefins suitable for use herein preferably include those of the ethylenic and cycloethylenic series up to 8 carbon atoms per molecule, e.g., ethylene, propylene, butenes, pentenes, hexenes, heptenes and octenes; cyclobutenes, cyclopentenes, cyclohexenes, cyclooctenes, etc. Of particular interest, utility and convenience are acyclic olefins containing from 2 to 8 carbon atoms. Included are alkyl-substituted olefins such as 2-methyl-1-butene, 2-methyl-2-butene, 2-methyl-propene, 4-methyl-2-pentene, 2,3-dimethyl-2-butene and 2-methyl-2-pentene. Other suitable olefinic compounds include dienes such as butadiene, isoprene, other pentadienes and hexadienes, cyclopentenes, cyclohexenes, cyclopentadiene, vinyl-substituted cycloalkenes and benzenes, styrene, methylstyrene, and other vinyl-substituted aromatic systems.

It is to be understood that the foregoing detailed description is merely illustrative of the invention and that many variations will occur to those skilled in the art without departing from the spirit and scope of this invention.

We claim:
1. Process for the continuous production and recovery of propylene oxide which comprises the direct oxidation of propylene feedstocks with molecular oxygen in a solvent selected from the group consisting of fully esterified polyacyl esters of polyhydroxyalkanes, polyhydroxycycloalkanes, polyglycols and mixtures thereof, wherein said esters contain from 1 to 18 carbon atoms in each acyl moiety and from 2 to 18 carbon atoms in each alkylene and cycloalkylene moiety, and recovering formed propylene oxide by:

(a) directing an effluent stream of the reaction mixture from a reaction zone through a combination let-down distillation zone comprising a flashing zone followed by a stripping zone, said flashing zone and stripping zone being maintained at essentially the same temperature as the oxidation reaction, but each successive zone being maintained at pressures substantially lower than in the preceding zone and in said reaction zone in order to separate substantially all of the low and intermediate boiling products as gas phase from the bulk of the solvent, (b) passing said gas phase to condensing zones, from whence uncondensed gases are directed to an absorbing zone into which effluent solvent from said stripping zone is also passed to absorb uncondensed propylene and propylene oxide, (c) directing a side-stream of said effluent solvent in (b) through a polymeric residue having a boiling point above that of said solvent removal zone where residue is removed as bottoms and solvent is distilled overhead and recombined with the solvent bottoms from said stripping zone and fed to said absorbing zone.

(d) passing a combined stream of condensed liquids from said condensing zones into an acids-separation distillation zone where organic acids are removed as bottoms and propylene oxide, propylene, propane, acetaldehyde and methyl formate are distilled overhead, (e) directing the overhead from (d) to a $C_3$ removal zone where propylene and propane are distilled overhead and propylene oxide, acetaldehyde and methyl formate are removed as bottoms, (f) passing said bottoms from said $C_3$ removal zone to a reaction zone containing a caustic reaction medium wherein acetaldehyde is adolized and methyl formate saponified simultaneously, (g) passing bottoms from said reaction zone in (f) to an evaporation zone where solids are removed as bottoms and an overhead stream containing crotonaldehyde, methanol, water and propylene oxide are recycled to said reaction zone in step (f), (h) directing the overhead stream from said reaction zone in (f) to a distillation zone where any acetaldehyde not completely adolized in (f) is taken overhead and recycled with small amounts of propylene oxide to said reaction zone in step (f), (i) passing the bottoms from said distillation zone in step (h) to a propylene oxide refining zone from which purified propylene oxide is recovered overhead.

2. Process according to claim 1 wherein the overhead containing propylene and propane from said $C_3$ removal zone in step (e) is fed to a propylene-propane distillation splitting zone to remove propane as bottoms and propylene as an overhead stream which is recycled to said reaction zone.

3. Process according to claim 1 wherein the overhead containing propylene and propane from said $C_3$ removal zone in step (e) is combined with uncondensed gases from said condensing zones and fed to said absorbing zone; feeding at least a portion of the bottoms from said absorbing zone to a desorbing zone from which solvent is removed as bottoms and combined with any solvent bottoms from said absorbing zone not fed to said desorbing zone and recycling this combined solvent bottoms stream to said reaction zone; passing the overhead stream containing propylene and propane from said desorbing zone to a propylene-propane distillation splitting zone to remove propane as bottoms and propylene as an overhead stream which is recycled to said reaction zone.

4. Process according to claim 1 wherein said solvent comprises at least one fully esterified polyacyl ester of a polyhydroxyalkane.

5. Process according to claim 4 wherein said polyacyl ester is ethylene glycol diacetate.

6. Process according to claim 4 wherein said polyacyl ester is propylene glycol diacetate.

7. Process according to claim 4 wherein said solvent comprises a mixture of ethylene glycol diacetate and propylene glycol diacetate.

8. Process according to claim 1 wherein said oxidation occurs at temperatures within the range of from 50° C. to 400° C. and pressures within the range of from 0.5 to 350 atmospheres.

9. Process according to claim 8 wherein said oxidation occurs in the absence of added catalysts.

10. Process for the continuous production and recovery of propylene oxide which comprises the direct oxidation of propylene with molecular oxygen in a reaction zone at a temperature of about 200° C. and a pressure of 750 p.s.i.g. in a solvent selected from the group consisting of fully esterified polyacyl esters of polyhydroxyalkanes, polyhydroxycycloalkanes, polyglycols and mixtures thereof, wherein said esters contain from 1 to 18 carbon atoms in each acyl moiety and from 2 to 18 carbon atoms in each alkylene and cycloalkylene moiety, and recovering the thus-formed propylene oxide by:

(a) directing an effluent stream of the reaction mixture from said reaction zone to a flashing zone operating at about 200° C. and 150 p.s.i.a. pressure to remove major amounts of propylene oxide, acids and dissolved gases overhead to a first condensing zone and the bulk of the solvent as bottoms, (b) passing the bottoms from (a) to a distillation stripping zone operating at about 210° C. and 25 p.s.i.a. wherein all of the remaining propylene oxide and all but a trace of acids is taken overhead to a second condensing zone and solvent is removed as bottoms, (c) passing the bottoms from (b) to an absorbing zone operating at about 70° C. at the top and 100° C. at the bottom and 120 p.s.i.a. into which a stream of uncondensed gases from said first condensing zone is also fed, and propane, propylene and small amounts of propylene oxide are absorbed in said solvent, while (d) directing a side-stream of said solvent bottoms from (c) to a residue-removal distillation zone operating at temperatures of about 150° C. at the top and 210° C. at the bottom and a pressure of 250 mm. Hg where residue is removed as bottoms and solvent is removed overhead and recombined with solvent bottoms from said stripping zone and fed to said absorbing zone, (e) combining condensed liquid streams from said first and second condensing zones and feeding this combined stream to an acids-separation distillation zone operating at about 40° C. at the top and 210° C. at the bottom and 150 p.s.i.a. pressure to remove acids as bottoms and an overhead stream comprising propylene oxide, propylene, propane, acetaldehyde and methyl formate, (f) feeding said overhead stream from (e) to a $C_3$ removal distillation zone operating at about 50° C. at the top and 160° C. at the bottom and 300 p.s.i.a. pressure wherein propylene and propane are removed overhead and propylene oxide, acetaldehyde and methyl formate are removed as bottoms, (g) passing the bottoms from (f) to a stirred reactor operating at from 25° C. to 75° C. and from 1 to 10 atmospheres pressure and containing an aqueous caustic solution of from 1 N to 10 N concentration, wherein acetaldehyde is aldolized and methyl formate saponified simultaneously, (h) passing bottoms from said reactor in step (g) to an evaporation zone operating at about 100° C. and 15 p.s.i.a. from which aldol polymers and other solids are removed as bottoms and propylene oxide, crotonaldehyde, water and methanol are removed overhead and recycled to said reactor in step (g), (i) directing the overhead from said reactor in step (g) to a distillation zone operating at about 33 p.s.i.a. pressure and temperatures of about 50° C. at the top and 60° C. at the bottom from which any aldehyde not completely aldolized in step (2) is taken overhead with small amounts of propylene oxide and recycled to said reactor in step (g), (j) passing the bottoms from said distillation zone in step (i) to a propylene oxide refining zone operating at about 50° C. at the top and 125° C. at the bottom and about 30 p.s.i.a. pressure and from which purified propylene oxide is recovered overhead.

11. Process according to claim 10 wherein said solvent comprises at least one fully esterified polyacyl ester of a polyhydroxyalkane.

12. Process according to claim 11 wherein said polyacyl ester comprises ethylene glycol diacetate.

13. Process according to claim 11 wherein said polyacyl ester comprises propylene glycol diacetate.

14. Process according to claim 11 wherein said solvent comprises a mixture of ethylene glycol diacetate and propylene glycol diacetate.

References Cited
UNITED STATES PATENTS

| | | | |
|---|---|---|---|
| 3,024,170 | 3/1962 | Othmer et al. | 203—67 |
| 3,097,215 | 7/1963 | Courter et al. | 203—42 |
| 3,153,058 | 10/1964 | Sharp et al. | 260—348.5 |
| 3,165,539 | 1/1965 | Lutz | 203—42 |
| 3,207,677 | 9/1965 | Colton | 203—88 |
| 3,254,962 | 6/1966 | Fox et al. | 203—42 |

NORMAN YUDKOFF, *Primary Examiner.*

WILBUR L. BASCOMB, JR., *Examiner.*

PO-1050
(5/69)

UNITED STATES PATENT OFFICE
CERTIFICATE OF CORRECTION

Patent No. 3,350,417        Dated October 31, 1967

Inventor(s) R. C. Binning et al

It is certified that error appears in the above-identified patent and that said Letters Patent are hereby corrected as shown below:

Column 2, line 32, "critically" should be -- criticality --.

Column 2, line 44, after "molecular oxygen" should be inserted -- organic --.

Column 3, lines 20 and 21, "anticatalyists;" should be -- anticatalysts; --.

Column 3, line 71, "Branched-chained glycols" should be -- Branched-chain glycols --.

Column 4, line 49, "butylene glycol acetate caporate," should be -- butylene glycol acetate caproate, --.

Column 6, line 14, "versatality" should be -- versatility --.

Column 11, line 12, "by-produces" should be -- by-products --.

Column 13, lines 22-24, "(b) through a polymeric residue having a boiling point above that of said solvent removal zone where residue is removed" should be -- (b) through a residue removal zone where polymeric residue having a boiling point above that of said solvent is removed --.

Signed and sealed this 1st day of June 1971.

(SEAL)
Attest:

EDWARD M. FLETCHER, JR.        WILLIAM E. SCHUYLER, JR.
Attesting Officer               Commissioner of Patents